(12) United States Patent
Willis

(10) Patent No.: US 7,315,794 B1
(45) Date of Patent: Jan. 1, 2008

(54) TIMBER SURVEY PROCESS AND APPARATUS

(76) Inventor: Frank L. Willis, 1822 N. City Park Blvd., Alexandria, LA (US) 71301

( * ) Notice: Subject to any disclaimer, the term of this patent is extended or adjusted under 35 U.S.C. 154(b) by 245 days.

(21) Appl. No.: 11/087,952

(22) Filed: Mar. 23, 2005

Related U.S. Application Data

(60) Provisional application No. 60/555,587, filed on Mar. 23, 2004.

(51) Int. Cl.
*G06F 15/00* (2006.01)

(52) U.S. Cl. .................. 702/159; 702/155

(58) Field of Classification Search .......... 250/201.6; 356/3, 3.01, 3.02, 3.03, 3.1, 3.11, 9, 11, 14, 356/602, 603, 604, 605, 606, 607, 608, 609, 356/610, 611, 612, 622, 623, 634, 635; 702/155, 702/158, 159, 127, 157
See application file for complete search history.

(56) References Cited

U.S. PATENT DOCUMENTS

| | | | |
|---|---|---|---|
| 4,837,717 A * | 6/1989 | Wiklund et al. ............ | 702/157 |
| 6,100,986 A | 8/2000 | Rydningen | |
| 6,141,091 A * | 10/2000 | Ball ........................... | 356/146 |
| 6,282,362 B1 * | 8/2001 | Murphy et al. ............... | 386/46 |
| 6,738,148 B2 * | 5/2004 | Dunne et al. ............... | 356/635 |
| 6,862,083 B1 * | 3/2005 | McConnell et al. ....... | 356/4.01 |
| 2002/0191198 A1 | 12/2002 | Dunne et al. | |
| 2003/0174305 A1 * | 9/2003 | Kasper et al. ............ | 356/3.09 |
| 2006/0100816 A1 * | 5/2006 | Prentice et al. ............ | 702/127 |

* cited by examiner

*Primary Examiner*—John Barlow
*Assistant Examiner*—Douglas N Washburn
(74) *Attorney, Agent, or Firm*—Jones, Walker, Waechter, Poitevent, Carrere & Denegre, L.L.P.

(57) ABSTRACT

A timer survey system performing the steps of: placing a first reference point and a second reference point on a tree trunk, wherein an actual distance between the first reference point and the second reference point is a known distance, "$A_1$"; capturing an image of that portion of the tree trunk having the reference points placed on the trunk; measuring on the image an image distance, "$D_1$", between the first reference point and the second reference point; measuring on the image an image distance, "$D_2$", between the left outer boundary and the right outer boundary of the tree trunk; and calculating an actual distance, "$A_2$", between the left outer boundary and the right outer boundary of the tree trunk as follows: $A_2 = [(D_2 \div D_1)(A_1)]$.

9 Claims, 9 Drawing Sheets

TIMBER SURVEY PROCESS AND APPARATUS

This application claims priority to U.S. Patent Application Ser. No. 60/555,587 filed on Mar. 23, 2004 which is incorporated by reference herein in its entirety.

TECHNICAL FIELD

The present invention relates to an apparatus and method of measuring and calculating certain dimensions and distances on and about an object. In particular, one embodiment of the invention specifically pertains to measuring and calculating certain dimensions and distances on and about standing timber.

DETAILED WRITTEN DESCRIPTION

Figure 1:
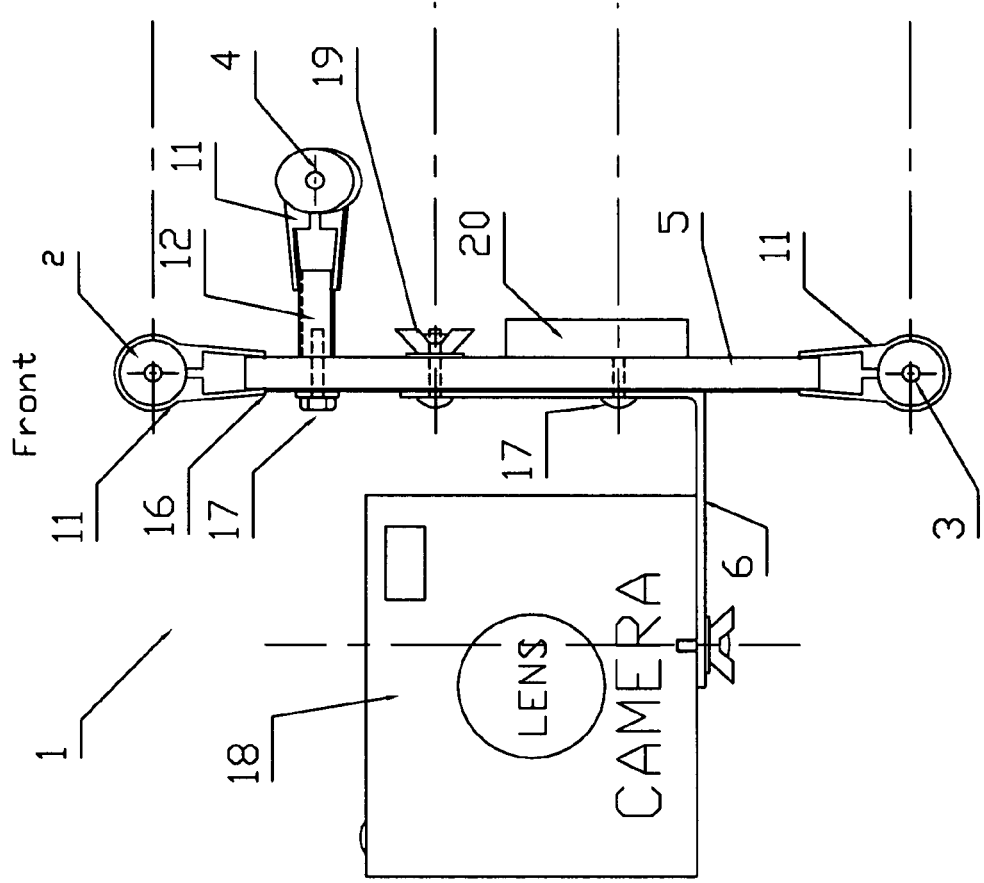
FIG. 1 is a front view of one embodiment of the invention.
Figure 2:
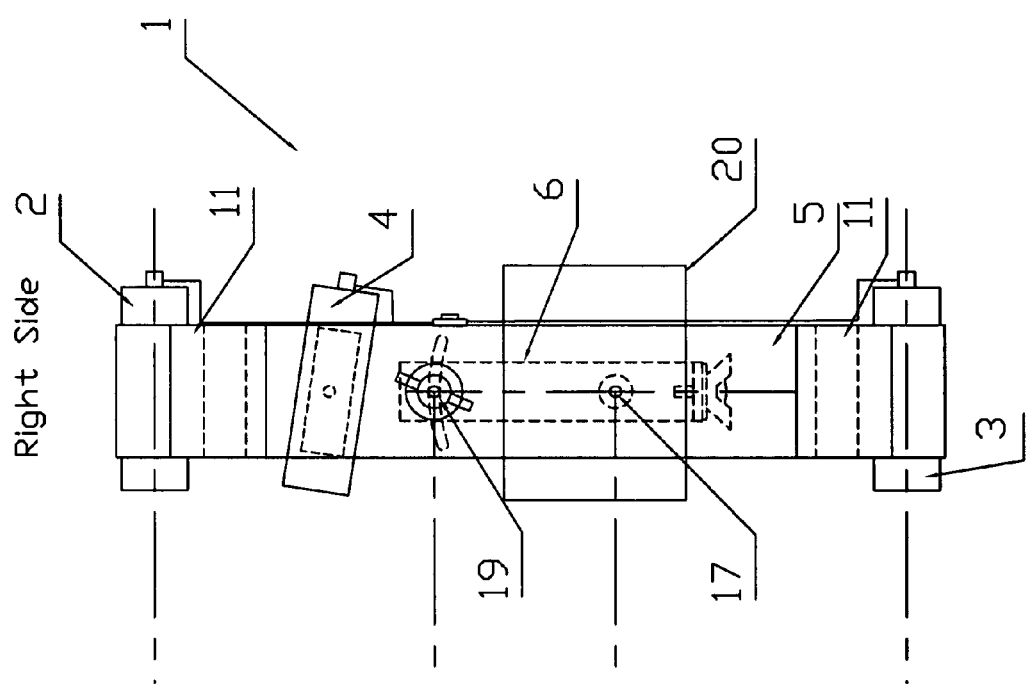
FIG. 2 is a side view of the embodiment depicted in FIG. 1.

The present invention relates to an apparatus and process for determining unknown measurements and distances, including but not limited to the diameter, height and volume of standing timber. An embodiment of the apparatus is illustrated in FIGS. 1 and 2 and is referred to in the following description as timber meter 1. Timber meter 1 will generally comprise a first projection source 2, a second projection source 3 and a third projection source 4 positioned on a frame 5. A "projection source" as used herein shall comprise any device capable of effecting a detectable reference point on the surface of object. In the illustrated embodiment, projection sources 2,3,4 will be comprised of laser light emitters ("lasers"). The projection sources are not limited to lasers and any method or device for placing a recordable mark on a tree is intended to come within the definition of projection source.

Frame 5 is depicted as an elongated planar structure, but may comprise any other shaped structure that is sufficient for supporting projection sources 2,3,4. Each projection source 2,3,4 will be attached to frame 5 by a connector assembly 11. In the illustrated embodiment, first and second projection sources 2,3 are connected to the longitudinal ends of frame 5 via connector assemblies 11. The ends of the connector assemblies 11 are seated in mounting grooves 16. The third projection source 4 will be connected to frame 5 by arm 12 and connector assembly 11. As shown, arm 12 is connected to frame 5 by bolt assembly 17.

Figure 4:
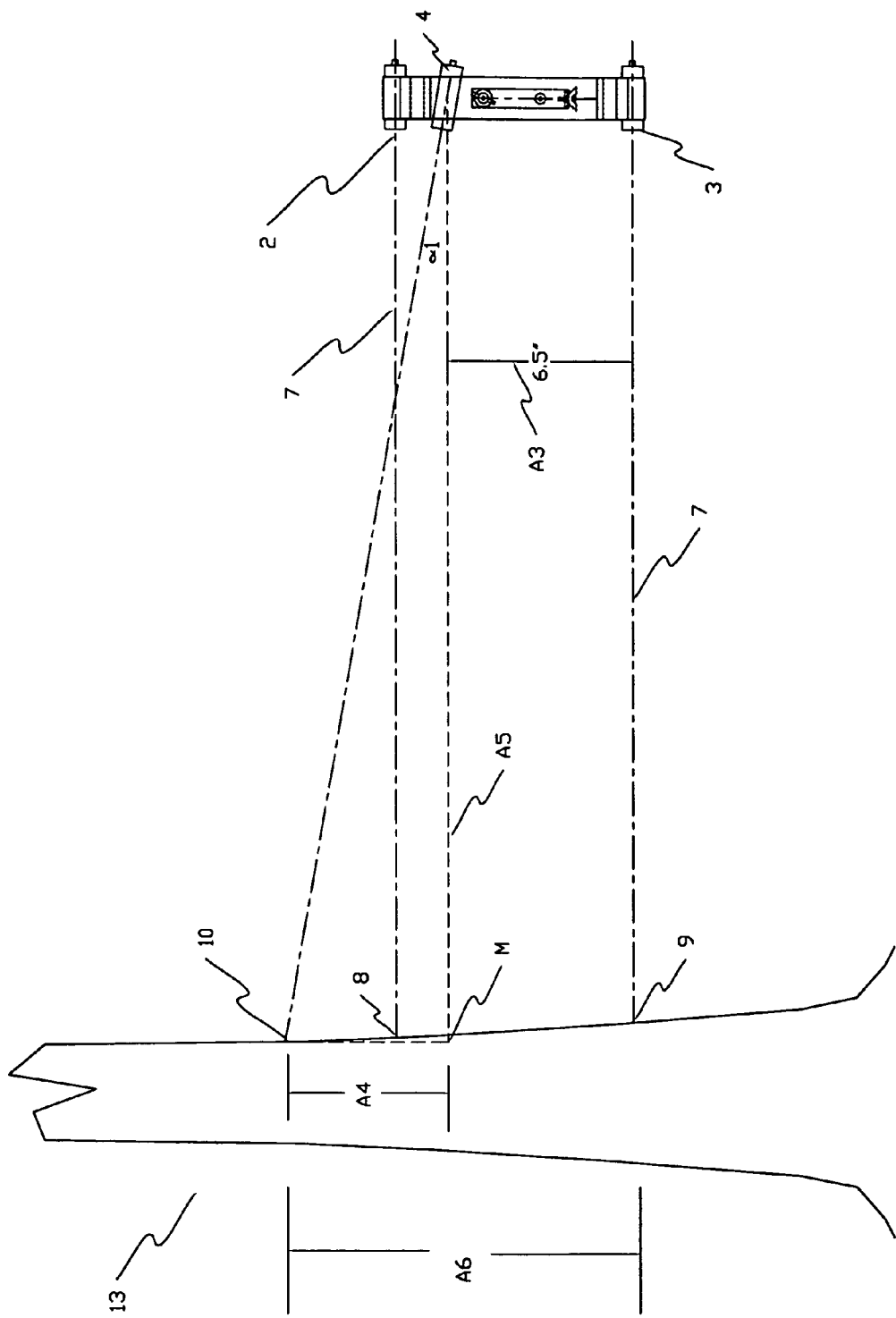
FIG. 4 is a diagram of one embodiment of the invention placing projection points on a tree.

The first projection source 2 and the second projection source 3 will be positioned on the frame 5 so that the projection paths 7 (shown on FIG. 4) of the first and second projection sources 2,3 are substantially parallel. As used herein, a "projection path" will comprise the straight line between the projection source to its respective reference point. As best illustrated in FIGS. 2 and 4, the third projection source 4 will be oriented at an angle relative to the projection paths 7 (shown on FIG. 4) of the first and second projection sources 2,3. In one embodiment of the invention, the angle of the third projection source 4 will be fixed at some known angle, $\alpha_1$. In another embodiment of the invention, the angle of third projection source 4 will be adjustable among various known angles, $\alpha_1$. In yet another embodiment of the invention, the timber meter 1 will further comprise markings for reading the angle, $\alpha_1$, at which the third projection source 4 is positioned.

As shown in FIG. 1, some embodiments of timber meter 1 will comprise a bracket 6 for connecting the timber meter 1 to an image capturing device 18. As used herein "image capturing device" will include any digital or non-digital camera, PDA, cell phone w/camera or any other device capable of capturing an image on an object having reference points placed thereon. In the embodiment illustrated in FIGS. 1 and 2, bracket 6 is an "L" shaped bracket designed to be mounted to the bottom of an image capturing device. Bracket 6 will connect to frame 5 by bolt 17 and wing nut 19. In one embodiment of the invention, the connector 6 will attach to the bottom of a digital camera at the point on the digital camera where a conventional tripod would mount. In an alternate embodiment of the invention, the timber meter 1 will include the image capturing device integrally formed therewith. In yet another embodiment of the invention, the image capturing device would not necessarily be connected to timber meter 1.

FIG. 2 depicts an angle measuring device 20 connected to frame 5. In alternate embodiments, the angle measuring device may not be directly connected to frame 5 (i.e., connected to, or incorporated with, the image capturing device 18). The angle measuring device 20 in the illustrated embodiment is a conventional clinometer. As will be further explained below, the clinometer will be used to determine angles of incline from the timber meter 1 to the top portion of a tree and the angle of decline from the timber meter 1 to the base portion of a tree. In one embodiment, clinometer 20 is manufactured by Suunto. In an alternate embodiment of the invention, the timber meter will further comprise a conventional GPS for determining and/or storing the coordinates for the location of the surveyed timber and/or the location of the timber meter 1 at the time the timber is surveyed. In yet another embodiment of the invention, the timber meter 1 will comprise a means for recording audio. Means for recording may include audio recording capabilities on the image capturing device, as well as a separate audio recording device. In still yet another alternate embodiment, the timber meter 1 will further comprise a toggle switch for turning the projection sources 2,3,4 on and off.

Although the illustrated embodiment depicts three projection sources 2,3,4, an alternate embodiment of the apparatus may consist of only two projection sources 2,3. As will be better understood in light of the discussion below, only two reference points of a known distance apart are required to determine the diameter of a tree. Therefore, if only the diameter need be determined, a timber meter 1 with only a first projection source 2 and a second projection source 3 is sufficient. The addition of the third projection source 4, as will be explained below, assists in determining, among other measurements, the height of a tree. However, height may still be determined without the third projection source 4, provided certain other distances are known. The embodiment of timber meter 1 illustrated in FIGS. 1 and 2 depicts the first and second projection sources 2,3 being vertically aligned with the third projection source 4 being offset from the vertical plane of projection sources 2,3. However, any configuration and/or alignment of the projection sources 2,3,4 may be used, provided the reference points effected therefrom permit the below described process to be performed.

The present invention also pertains to a process for placing a reference object of a known length, or two reference points of a known distance apart, on the trunk of a tree for purposes of calculating certain unknown dimensions of the tree, such as the actual diameter of the tree. As explained below, the process may further comprise placing a third reference point on the trunk of a tree to determine additional unknown dimensions of the tree, such as the distance of the third projection source 10 from the tree. Once the diameter and height of the tree are known, the volume of the tree may then be calculated. A "reference object" will comprise any object having a measurable length, including but not limited to a ruler, spray-paint can, stick, etc. Likewise, a "reference point" may be any detectable mark including but not limited to marks painted or projected onto the tree, such as spray-painted marks or marks projected from a laser. As will be discussed in greater detail below, the reference object, or reference points will be placed on the trunk of a tree, or held directly in front of a tree, and then an image of the reference object or reference points will be captured using an image capturing device. Because the actual length of the reference object, or the actual distance between the reference points, as the case may be, will be known, other unknown measurements of the tree will then be determinable based upon measurements taken from the image.

Figure 3A:
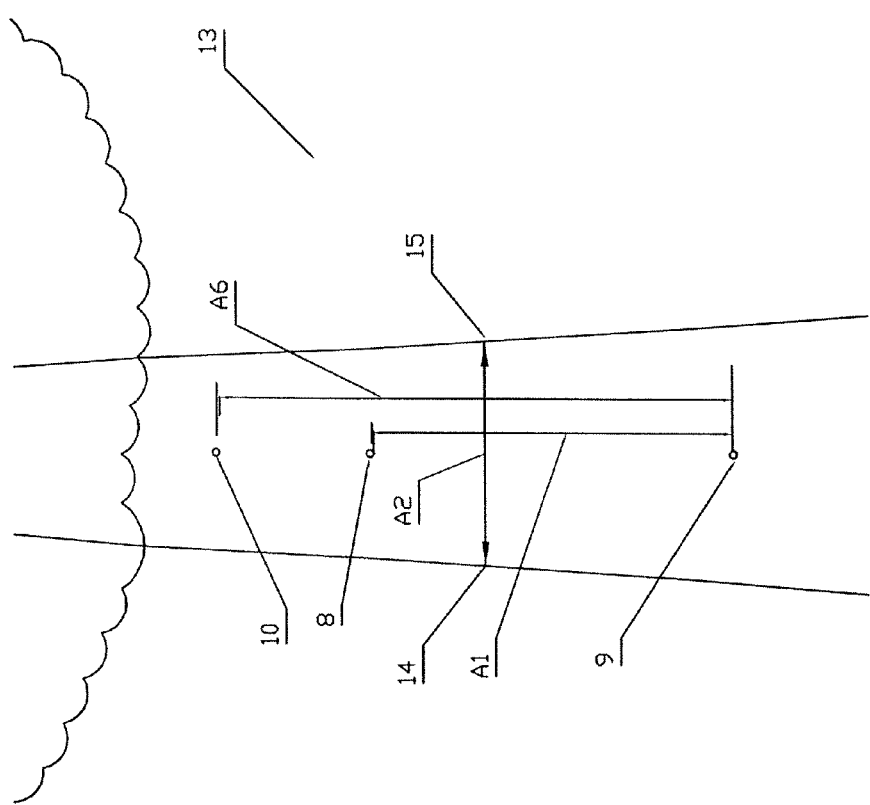
FIG. 3A is a diagram representing an actual tree with reference points.
Figure 3B:
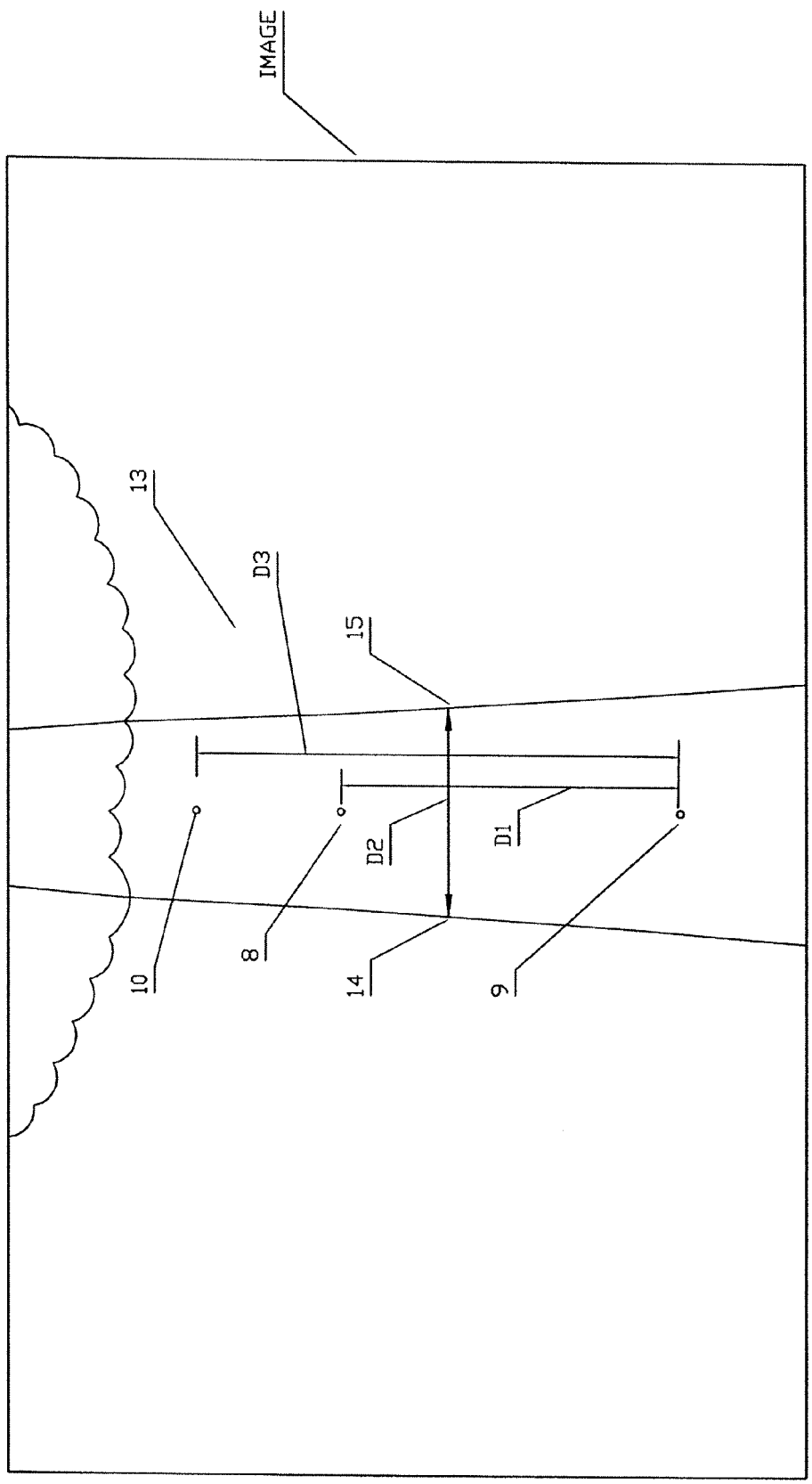
FIG. 3B is a diagram representing an image of a tree with reference points.

FIG. 3A represents an actual view of tree 13 and includes actual distances thereon. In contrast, FIG. 3B represents an image or photograph of tree 13 and therefore has image distances included thereon. An "image distance" describes a distance taken from an image, whereas an "actual distance" describes the actual distance that the image was derived from. For purposes of the following discussion, distances denoted by the letter "A" will be actual distances, and therefore illustrated on FIG. 3A, and distances denoted by the letter "D" will be image distances shown on FIG. 3B. FIGS. 3A and 3B illustrate a process for calculating the actual diameter of a tree comprising placing a first reference point 8 and a second reference point 9 on the trunk of a tree 13, wherein the actual distance between the first reference point 8 and the second reference point 9 is a known actual distance, "$A_1$". The process further comprises the step of using an image capturing device to capture an image of that potion of the tree having reference points 8,9 placed thereon. The image may be captured using any conventional image capturing device, including but not limited to a digital camera. Using the captured image, the image distance "$D_1$", between the first reference point 8 and the second reference point 9 and the image distance, "$D_2$", between the left outer boundary 14 (i.e., left side) and the right outer boundary 15 (i.e., right side) of the tree 13, will then be measured. To further clarify the distinction between actual and image distances, $D_1$ and $D_2$ are not measurements taken from the actual tree, but instead are measurements taken from the image of the tree. As one non-limiting invention, $A_1$ may represent an actual distance of 8.7 inches between the first and second reference points 8,9, while $D_1$ may represent an image distance of 4 centimeters between the same first and second reference points 8,9 as measured from a photograph of the tree. In one embodiment of the invention, an "image distance" will be measured in number of pixels, as when measuring a distance from a digital image. The actual distance, "$A_2$" between the left outer boundary 14 and the right outer boundary 15 will then be calculated using the following equation:

$$A_2 = [(D_2 \div D_1)(A_1)]$$

$A_2$ will be equivalent to the actual diameter of the tree 13. If the actual height of the tree is known, the volume of the tree can then be measured using $A_2$. If the actual height of the tree is unknown, it can be derived by adding to the above described process the steps of taking angle measurements to the top and base of the tree and determining the distance to the tree (from the angle measuring device 20) as explained below.

To find the distance to the tree, one embodiment of the invention places a third reference point on the tree. FIG. 4 illustrates placing this third reference point 10 on the trunk of a tree, wherein the third reference point 10 is projected from the third projection source 4. Likewise, in the illustrated embodiment the first projection source 2 and the second projection source 3 will be used to place the first reference point 8 and the second reference point 9 on the tree. In this particular illustrated embodiment, the projection sources 2,3,4 will comprise lasers. The projection paths 7 of the first and second projection sources 2,3 will be parallel to one another and held substantially perpendicular to the longitudinal length of the tree 13. Because projection source 2 and projection source 3 are positioned parallel to one another and perpendicular to the tree, the distance separating the two projection sources 2,3 will be the same distance separating reference points 8,9. Also, because projection sources 2,3 are comprised of lasers in the illustrated embodiment, the distance between reference points 8,9 will remain effectively constant for all practical distances at which the invention will be employed. As shown, the third projection source 4 will be positioned at a known angle, "$\alpha_1$", relative to projection sources 2,3 and positioned at a known actual distance, "$A_3$", from the second projection source 3. In the illustrated embodiment, the third projection source 4 is positioned between the first and second projection sources 2,3, and will be offset from the vertical plane of the first and second projection sources 2,3 as shown in FIG. 2. In an alternate embodiment of the invention, the third projection source 4 will not be positioned between the first and second projection sources 2,3. In yet another embodiment of the invention, the third projection source 4 will not be offset from the vertical plane of projection sources 2,3.

The process illustrated in FIG. 4 will comprise the step of capturing an image of all three reference points 8,9,10 as those points appear on the trunk of the tree 13 being measured. In one embodiment, the calculation of the distance $A_5$ from the tree 13 to timber meter 1 (and this third projection source 4) begins by calculating "$A_6$", where $A_6$ is the actual distance between the third reference point 10 and the first reference point 8. In order to calculate $A_6$, the image distance, "$D_3$", between the third reference point 10 and the first reference point 8, will first be measured. $D_3$ will then be used in conjunction with $D_1$ to calculate an actual distance $A_6$ using the following equation:

$$A_6 = [(D_3 \div D_1)(A_1)]$$

After $A_6$ has been calculated, another step in the process will be calculating the actual distance "$A_4$" measured as the vertical distance between the third projection point 10 and a point, "M", within the trunk of the tree 13 directly below the third projection point 10 and at the same height as projection source 4. Since point M is at the same height as third projection source 4, point M will be located a known actual distance, "$A_3$", from the second reference point 9. For example, $A_3$ in the embodiment illustrated in FIG. 4 will equal 6.5 inches. As further shown in FIG. 4, the third reference point 10, the third projection source 4 and point M, when connected together, will form a right triangle with point M being located at the intersection of the 90 degree angle. $A_4$ will be calculated as follows:

$$A_4 = A_6 - A_3$$

The value for $A_4$ may then be used to calculate the actual distance, "$A_5$", from the third projection source to point M in accordance with the following equation:

$$A_5 = A_4 \div [\tan(\acute{\alpha}_1)]$$

Figure 5:
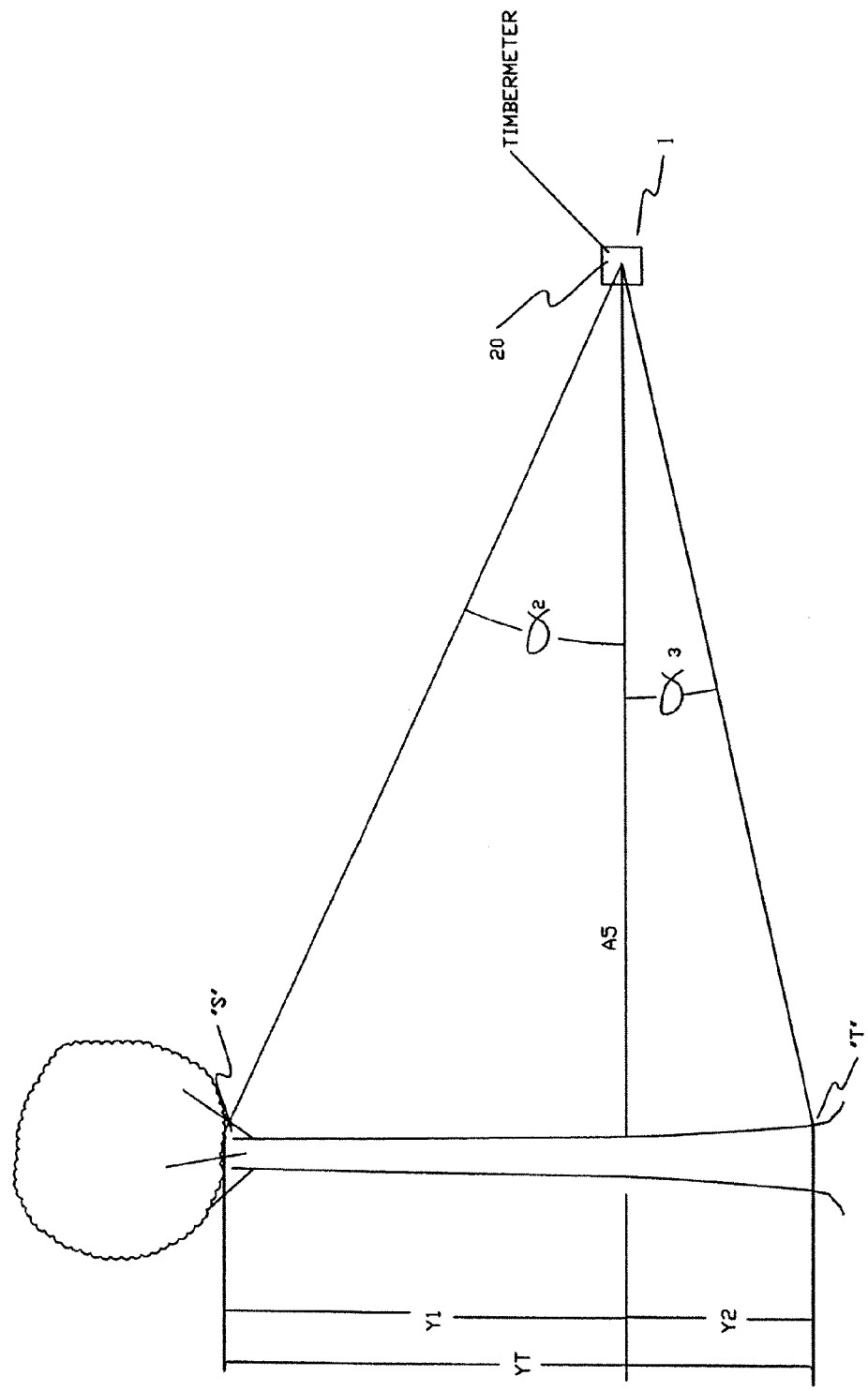
FIG. 5 is diagram of angles measures in one embodiment of the invention.

Using measurements from the captured image and angles measured by an angle measuring device suitable for measuring angles of incline and decline such as a clinometer, the height of the tree may be calculated through a series of calculations. FIG. 5 illustrates measuring the angle of incline to the top portion of a tree 13 and the angle of decline to the bottom portion of tree 13 using an angle measuring device such as clinometer 20. First, the angle "$\acute{\alpha}_2$" of incline to a point, "S", located at an approximate top of the tree 13 is measured. Then, the angle "$\acute{\alpha}_3$" of decline to a point "T" located at an approximate base of the tree 13 is measured. The measurements will be taken from the actual distance, $A_5$, from the tree 13. Using the value calculated for $A_5$ above, the actual height of the tree 13 may now be calculated using the following equations:

$$Y_1 = A_5 [\tan(\acute{\alpha}_2)]; \qquad 1.$$

$$Y_2 = A_5 [\tan(\acute{\alpha}_3)]; \text{ and} \qquad 2.$$

$$Y_T = Y_1 + Y_2. \qquad 3.$$

In the first equation above, "$Y_1$" is the actual height of an upper portion of the tree 13 calculated from the angle of incline, "$\acute{\alpha}_2$". In the second equation, "$Y_2$" is the actual height of a lower portion of the tree 13 calculated from the angle of decline, "$\acute{\alpha}_3$". In the third equation, "$Y_T$" is the total actual height of the tree calculated as the sum of $Y_1$ and $Y_2$. A further step in the process will include calculating the volume of the tree 13 using the actual diameter, $A_2$, and the actual height, $Y_T$ through any one of a number of conventional equations.

Some of the above described steps may be omitted from alternate embodiments of the invention depending upon the circumstances under which the process is practiced. For example, under some circumstances, the actual distance $A_5$ will already be known, as when the person using the timber meter 1 measures the actual distance from the timber meter 1 to the tree 13 using any conventional means for accomplishing the same such as with a rope of a known length, a measuring tape, or a range finder. In addition, it is foreseeable that a GPS may one day be used to determine the actual distance from the timber meter 1 to the tree 13 as the accuracy of conventional GPS devices is improved. If the value of $A_5$ is already known, the third reference point will not need to be used (unless used to confirm the accuracy of the known $A_5$ measurement). As a result, the calculation for solving $A_4$, $A_5$ and $A_6$ will be omitted from the process. Instead, the angle measuring device will be used from a location that is a distance of $A_5$ from the tree to determine angles $\acute{\alpha}_2$ and $\acute{\alpha}_3$. The actual height, $Y_T$, will then be calculated as above.

Some embodiments of the invention will include the step of recording audio information such as the angles of incline and decline measured from an clinometer, or the coordinates of a location read from a GPS. The calculations of the above described processes may also be carried out by computer software as described below.

Figure 6:
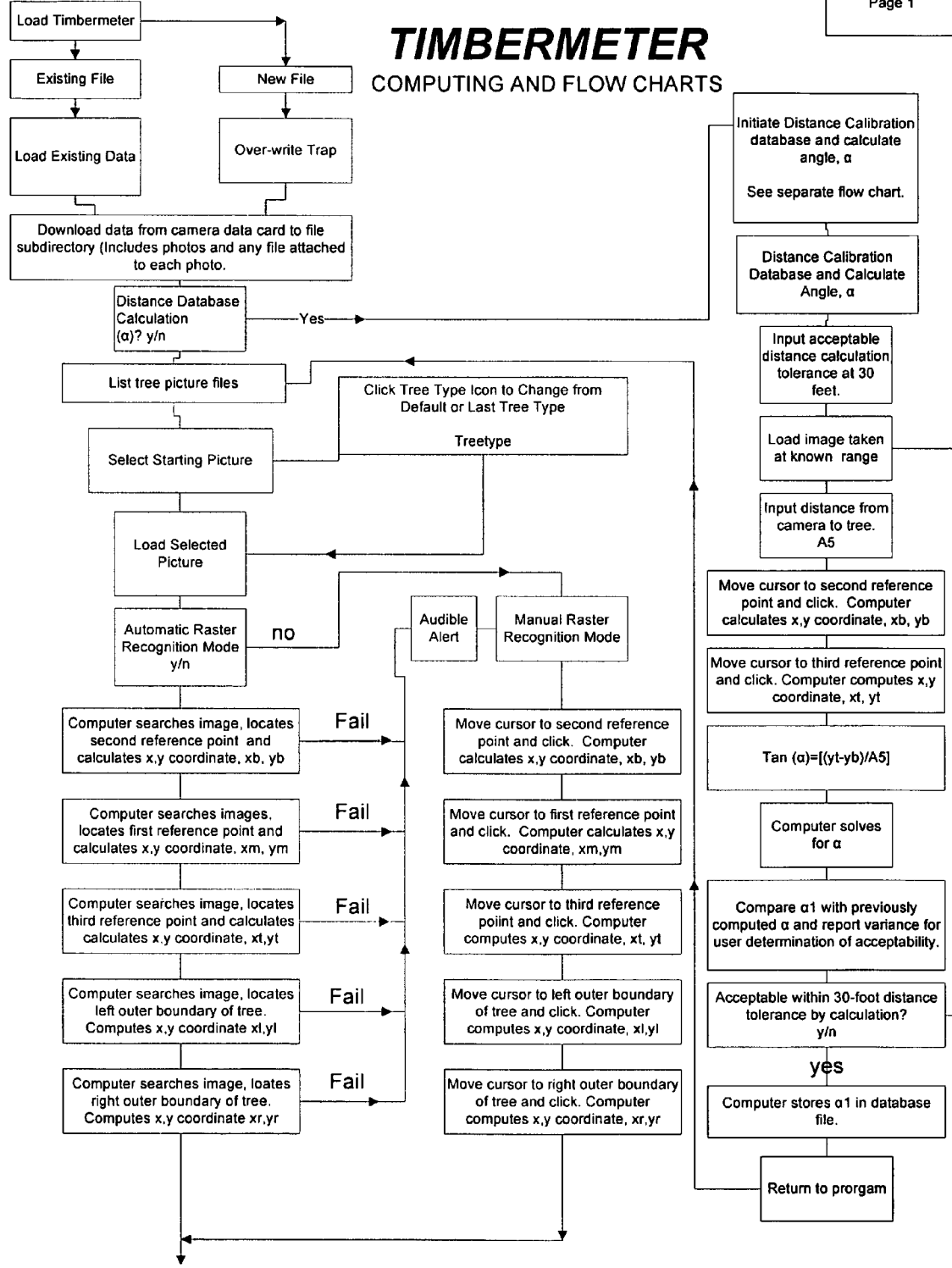
FIG. 6 is a flowchart depicting one process carried out in one embodiment of the invention.
Figure 6:
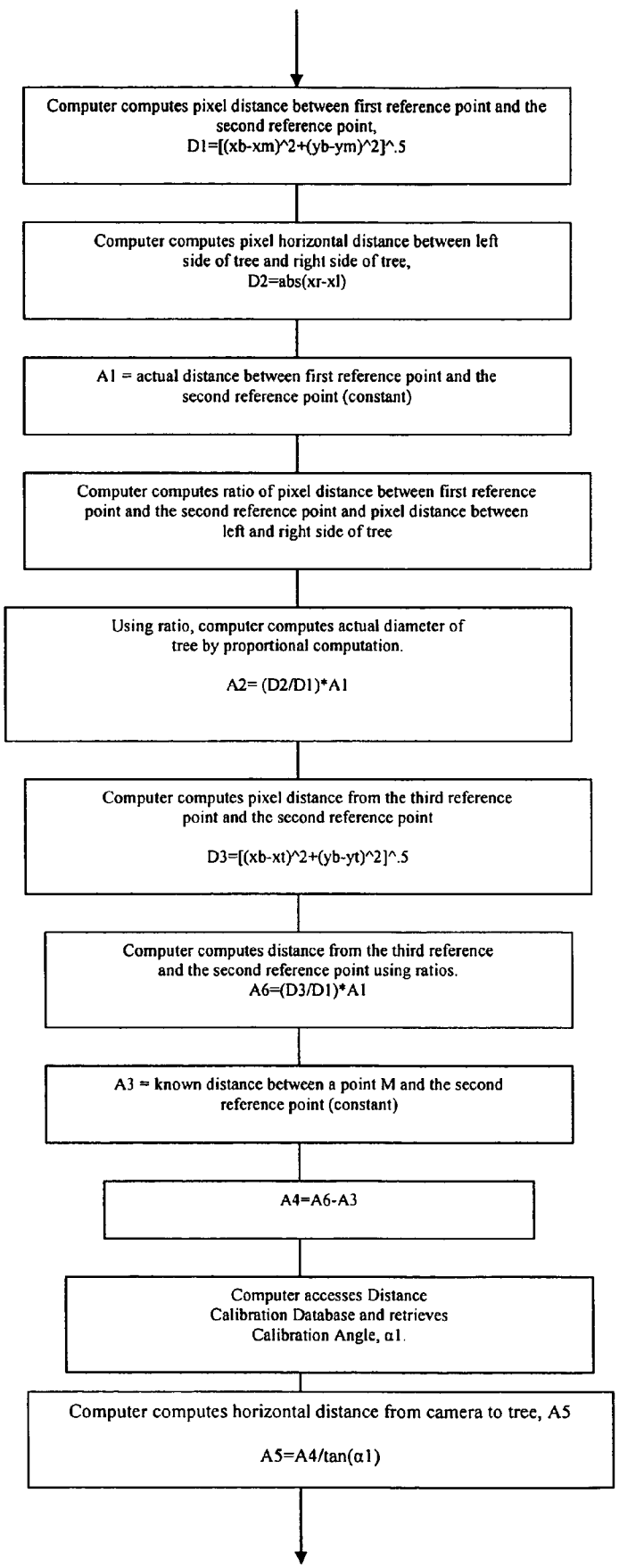
Figure 6:
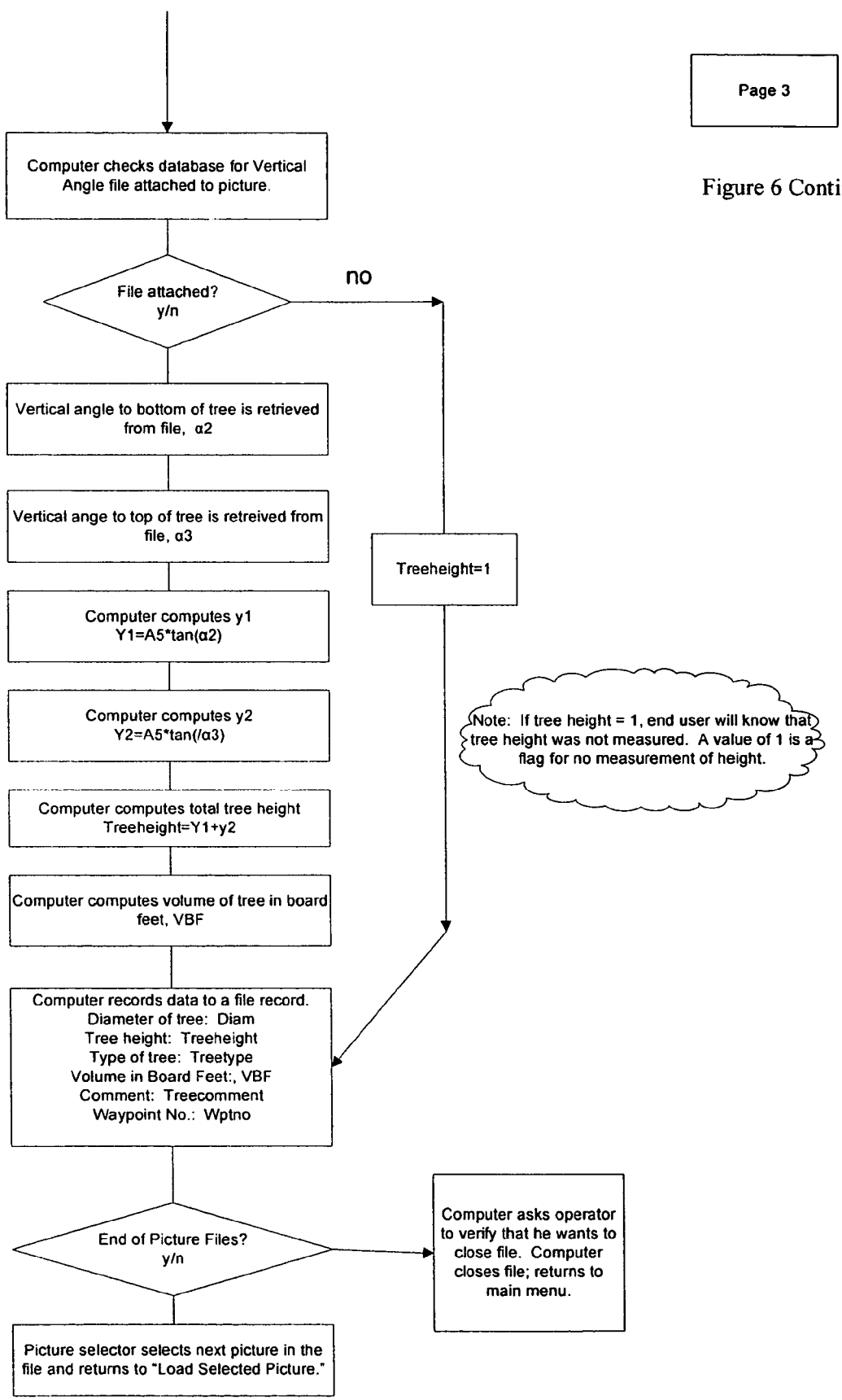

The present invention further pertains to software to determine, based upon user input, measurements such as the diameter, height and volume of a tree. FIG. 6 illustrates the basic steps to be performed by such software. As illustrated in the flow chart, the program is first called up on the computer. The user is then prompted to start a new file, or continue working under an existing file. If an existing file is chosen, the data obtained by the image capturing device is then downloaded from the image capturing device to the existing file subdirectory. If however, a new file is chosen by the user, the data from the image capturing device is then downloaded into the newly established file subdirectory. In one embodiment of the invention, the image capturing device will be a digital camera and the "data" downloaded will include digital photographs as well as any files attached to the photographs (e.g. audio files, GPS coordinates, type of tree, etc.). The data will be downloaded from the image capturing device's storage medium, which will include without limitation compact flash cards, or other storage medium used in connection with image capturing devices. In some embodiments of the invention, the image capturing device will be linked to the computer through linking means such as a USB cable for purposes of downloading data directly from the image capturing device. In alternate embodiment of the invention, the storage medium will be removed from the image capturing device and downloaded to the computer by a card reader or other input means. In yet another embodiment of the invention, the data will be inputted into the computer by scanning a printed photograph.

Once the data has been downloaded to the computer, the user is prompted to either initiate or decline initiation of the Distance Calibration database and to calculate angle, "$\acute{\alpha}$". This distance calibration function is not strictly necessary to the functioning of the invention and could be omitted in alternate embodiments. However, the function may be employed to help recognize deviations in the alignment of third projection source 10 due to mishandling, etc., or used to determine an initial angle $\acute{\alpha}$ under those circumstances where $\acute{\alpha}_1$ is unknown to the user. Under those circumstances the distance calibration function may be employed to determine angle a to be used for Angle $\acute{\alpha}$ is the calculated angle of the third projection source 10 using a known distance, $A_5$, from the timber meter to the tree. Distance $A_5$ is ordinarily determined by taping the distance from the timber meter to the tree or by using a laser distance meter. The process of taping or measuring the distance from the tree to a timber meter held in the user's hand may not be completely accurate, and may contain margin for error. In light of the potential for error, a user can calibrate the timber meter to compute an average angle $\acute{\alpha}$ by taking several images of trees from various known distances, $A_5$. An average angle $\acute{\alpha}$ can then be computed using the various known distances, $A_5$. The calculated distance from the timber meter to the tree using an averaged angle $\acute{\alpha}$ will generally be different from the actual taped or measured distance from the timber meter to the tree. This difference in measurements is due to the fact that the average a corrects for the small taping or measuring errors that may have occurred when taping the actual distance from the timber meter to the tree. The tolerance value entered by the user will warn the user when the tolerance between the actual and computed distance to the tree exceeds a preset tolerance. This would alert the user that there may be inconsistencies related to the expected angle $\acute{\alpha}_1$ and/or the distance to the tree which could cause miscalculations and which the user should investigate.

As mentioned above, if the Distance Calibration database is initiated, the user will input an acceptable distance calculation tolerance for purposes of checking the tolerance of the measurements when calculating angle $\acute{\alpha}$. In the illustrated embodiment, the acceptable distance calculation tolerance could be thirty feet. Next, an image that was taken from a known range is loaded, and the actual distance from the image capturing device to the tree, $A_5$, is inputted. At this point, the image of the tree and reference points placed thereon will be displayed on the user interface. The user then moves the cursor to, and clicks on, the second reference point 9 (shown in FIG. 3B). The computer then calculates the coordinates of the second reference point 9 as xb,yb. The user then moves the curser to, and clicks on, the third reference point 10 (shown in FIG. 3B). The computer then calculates the coordinates of the third reference point 10 as xt,yt. Using the following equation, the computer then solves for a:

$$\text{Tan}(\acute{\alpha}) = [(yt-yb) \div (A_5)]$$

In one embodiment the invention, an average angle $\acute{\alpha}$ will be obtained using several known distances from the timber meter to the tree. The computer then compares the above calculated $\acute{\alpha}$ with the known $\acute{\alpha}_1$ (angle of the third projection source 10 as inputted by the user) and reports the variance for user determination of acceptability. If the $\acute{\alpha}_1$ is acceptable, then $\acute{\alpha}_1$ is stored in the database file, and the computer proceeds to the next step. If $\acute{\alpha}_1$ is not acceptable, then $\acute{\alpha}$ instead of $\acute{\alpha}_1$ can be stored in the database and may be used for future calculations. In an alternate embodiment of the invention where $\acute{\alpha}_1$ is unknown to the user, $\acute{\alpha}$ instead of $\acute{\alpha}_1$ can be stored in the database and used for future calculations.

Next, tree picture files from the subdirectory are listed on the user interface. The user will then select one of tree picture files and input the type of tree selected. In one embodiment of the invention, the type of tree will impact the formula used to calculate the volume of a tree based upon the inherent dimensions of the type of tree being measured. For example, the degree of change in diameter along the longitudinal length of a tree can vary between types of trees. It is conceivable that tree constants may be derived for particular types of trees, wherein the tree constant accounts for the inherent dimensions of a particular tree type and serves as an adjustment constant for adjusting volume calculations based on the type of tree being measured. The selected tree picture file will then be loaded and displayed on the user interface. In the illustrated embodiment, the user will then be given the option to operate under an Automatic Raster Recognition Mode or, in the alternative, a Manual Raster Recognition Mode. In the Automatic Raster Recognition Mode, the computer automatically performs the steps of locating the reference points depicted on the loaded tree picture file. If, the computer is unable to detect a reference point, the user is prompted by an audible alert to locate the reference point under the Manual Raster Recognition Mode. Under manual mode, the user uses the cursor to select a reference point from the displayed tree picture file. Once a reference point has been manually selected, the computer calculates the selected reference point's x,y coordinates.

In the illustrated embodiment, if the Automatic Raster Recognition Mode is selected, the computer will search the loaded tree picture file for the second reference point 9 (illustrated in FIG. 3A/B), the first reference point 8 and the third reference point 10 and, if located, will then compute x,y coordinates for each point. In the illustrated embodiment, the x,y coordinates of the second reference point 9, first reference point 8 and third reference point 10 are denoted as follows: xb,yb (second), xm,ym (first) and xt,yt (third). The computer also automatically searches the tree picture file for the left and right outer boundaries 14,15 (as shown on FIG. 3B) of the tree and calculates x,y coordinates as follows: xl,yl (left outer boundary) and xr,yr (right outer boundary). As discussed above, if during the Automatic Raster Recognition Mode, one or more of the above described reference points are not detected during the automatic search, the user is then prompted to locate the unfound reference point(s) under the Manual Raster Recognition Mode.

Using the coordinates of the reference points, the computer then computes the image distance (measured in pixels), $D_1$, between first reference point 8 and the second reference point 9 using the following equation:

$$D_1 = [(xb-xm)^2 + (yb-ym)^2]^{0.5}$$

The computer then computes the image distance (measured in pixels), $D_2$, between the left and right outer boundaries 14, 15 (as shown in FIG. 3B) of the tree using the following equation (where "abs" represents the absolute value of):

$$D_2 = abs(xr-xl)$$

Using the known actual distance, $A_1$, between the first reference point 8 and the second reference point 9, the actual diameter, $A_2$, of the tree from the tree picture file is computed using the following equation:

$$A_2 = [(D_2 \div D_1)(A_1)]$$

The computer then computes the image distance (measured in pixels), $D_3$, from the third reference point 10 and the second reference point 9 using the following equation:

$$D_3 = [(xb-xt)^2 + (yb-yt)^2]^{0.5}$$

Using $D_3$, the computer then computes the actual distance, $A_6$, between the third reference point 10 and the second reference point 9 using the following equation:

$$A_6 = [(D_3 \div D_1)(A_1)]$$

After $A_6$ has been calculated, another step in the process will be calculating the actual distance "$A_4$" measured as the vertical distance between the third projection point 10 and a point, "M", within the trunk of the tree 13 directly below the third projection point 10 as shown on FIG. 4. Point M will be located a known actual distance "$A_3$" from the second reference point 9. $A_4$ will be calculated as follows:

$$A_4 = A_6 - A_3$$

The computer then accesses the Distance Calibration Database and retrieves angle, $\acute{\alpha}_1$. Using $\acute{\alpha}_1$, the computer computes the actual distance, $A_5$, from the image capturing device to the tree using the following equation:

Next, the computer checks its database to verify whether angles $\acute{\alpha}_2$ and $\acute{\alpha}_3$ are attached to the tree picture file (e.g. as audio files), where $\acute{\alpha}_2$ and $\acute{\alpha}_3$ represent the angles of incline and decline obtained from an angle measuring device to the top portion and bottom portion of a tree, respectively. The digital data representing $\acute{\alpha}_2$ and $\acute{\alpha}_3$ will have been previously attached to the file by any conventional means of attachment, including without limitation the following: 1) embedded digitally in the picture file and displayed on the camera screen, 2) attached to the tree picture file as an audio file or 3) a mirror somewhere on the timber meter causing the clinometer 20 reading to appear as part of the image. If yes, $\acute{\alpha}_2$ and $\acute{\alpha}_3$ are retrieved and the computer proceeds with computing the total actual height of the tree using the following equations:

$$Y_1 = A_5[\tan(\acute{\alpha}_2)]; \quad\quad 1.$$

$$Y_2 = A_5[\tan(\acute{\alpha}_3)]; \text{ and} \quad\quad 2.$$

$$Y_T = Y_1 + Y_2. \quad\quad 3.$$

Using the $Y_T$ and $A_2$, the computer then computes the volume of the tree in board feet. The computer then records measured data (e.g. diameter of tree, tree height, type of tree, volume in board feet, comments, GPS waypoints, etc.) to a file record. In the illustrated embodiment, the computer will record a tree height of "1" if the height of the tree was not measured. The computer then prompts the user to either select another tree picture file or return to the main menu. Although the above described embodiment calculates "image distances" using number of pixels, any other units may be used in lieu of pixels.

The present invention further relates to a computer-readable storage medium containing executable code for instructing a computer to operate as follows: measuring from an image of a tree, an image distance, "$D_1$", between a first reference point and a second reference point, wherein the actual distance, $A_1$, between the first reference point and the second reference point is known; measuring on said image an image distance, "$D_2$", between the left outer boundary and the right outer boundary of the trunk of said tree; and calculating an actual distance, "$A_2$", between the left outer boundary and the right outer boundary of the trunk of said tree as follows:

$$A_2 = [(D_2 \div D_1)(A_1)]$$

Although the present invention has been described in terms of specific embodiments, those skilled in the art will recognize many obvious variations and modification. All such variations and modifications are intended to come within the scope of the following claims.

I claim:

1. A process, comprising the following steps:
  a. employing a first and second projection source to place a first reference point and a second reference point on the trunk of a tree, such that projection paths of said projection sources are parallel to one another and substantially perpendicular to the longitudinal length of said tree, and wherein an actual distance between said first reference point and said second reference point is a known distance, "$A_1$";
  b. employing a third projection source to place a third reference point on the trunk of said tree, wherein said third projection source is positioned at a known angle, "$\acute{\alpha}_1$", relative to said first projection source and positioned a known actual distance, "$A_3$", from said second projection source;
  c. capturing an image of that portion of the trunk of said tree having said reference points placed thereon;
  d. measuring on said image an image distance, "$D_1$", between said first reference point and said second reference point;
  e. measuring on said image an image distance, "$D_2$", between the left outer boundary and the right outer boundary of the trunk of said tree;
  f. calculating an actual distance, "$A_2$", between a left outer boundary and a right outer boundary of the trunk of said tree as follows:

$$A_2 = [(D_2 \div D_1)(A_1)];$$

g. recording to a file record at least one of: i) said distance $A_2$; or ii) a tree measurement derived from said distance $A_2$.

2. The process of claim 1, further comprising the step of measuring on said image an image distance, "$D_3$", between said third reference point and said first reference point, and further comprising the step of calculating an actual distance, "$A_6$", between said third reference point and said first reference point as follows:

$$A_6 = [(D_3 \div D_1)(A_1)].$$

3. The process of claim 2, further comprising the step of calculating an actual distance "$A_4$" measured as the vertical distance between said third projection point and a point, "M", within the trunk of said tree directly below said third projection point, wherein said point "M" is located a distance of approximately "$A_3$" above said second projection point, wherein said actual distance, "$A_4$", is calculated as follows:

$$A_4 = A_6 - A_3.$$

4. The process of claim 3, wherein an actual distance, "$A_5$", from said third projection source to said point, "M", is calculated as:

$$A_5 = A_4 \div [\tan(\acute{\alpha}_1)].$$

5. The process of claim 4, further comprising the step of using an angle measuring device to measure the angle "$\acute{\alpha}_2$" of incline to a point, "S", located at an approximate top of said tree, and further comprising the step of using said angle measuring device to measure the angle "$\acute{\alpha}_3$" of decline to a point "T" located at an approximate base of said tree.

6. The process of claim 5, further comprising the step of calculating the height of said tree as follows:
  h. calculating a first height, "$Y_1$", as follows: $Y_1 = A_5[\tan(\acute{\alpha}_2)]$;
  i. calculating a second height, "$Y_2$", as follows: $Y_2 = A_5[\tan(\acute{\alpha}_3)]$; and
  j. calculating the total height, "$Y_T$", of said tree as follows: $Y_T = Y_1 + Y_2$.

7. The process of claim 6, further comprising the step of calculating a volume in board feet of said tree.

8. The process of claim 4, further comprising the step of determining said distance, "$A_5$", using a range finding device.

9. The process of claim 1, further comprising the step of recording audio data regarding said tree.

* * * * *